Figures 1, 4:
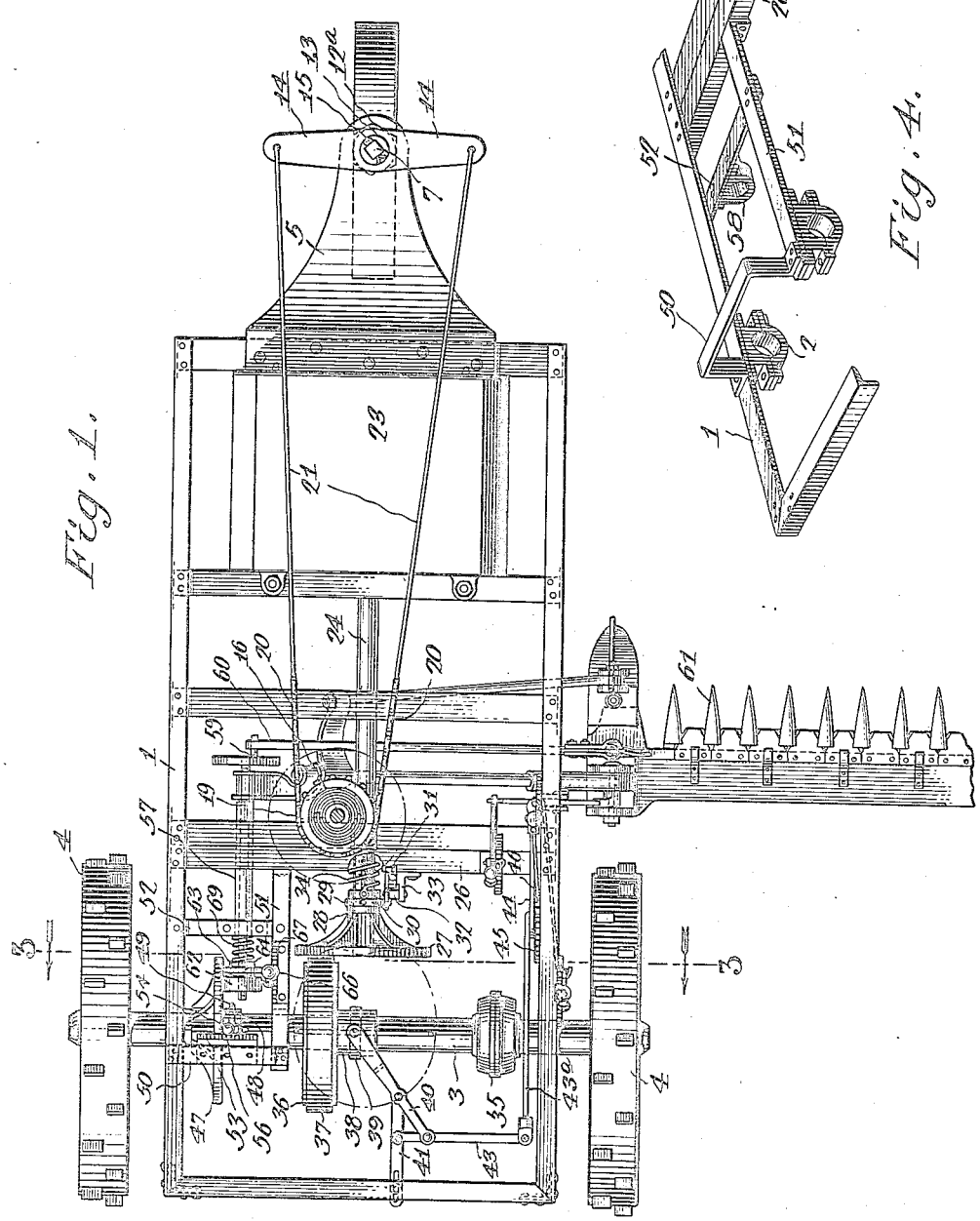

J. W. STUMP.
FIELD MOWER.
APPLICATION FILED MAR. 20, 1911.

1,042,167.

Patented Oct. 22, 1912.
2 SHEETS—SHEET 1.

WITNESSES
Jonathan W. Stump, INVENTOR.
By ____, his Attorney.

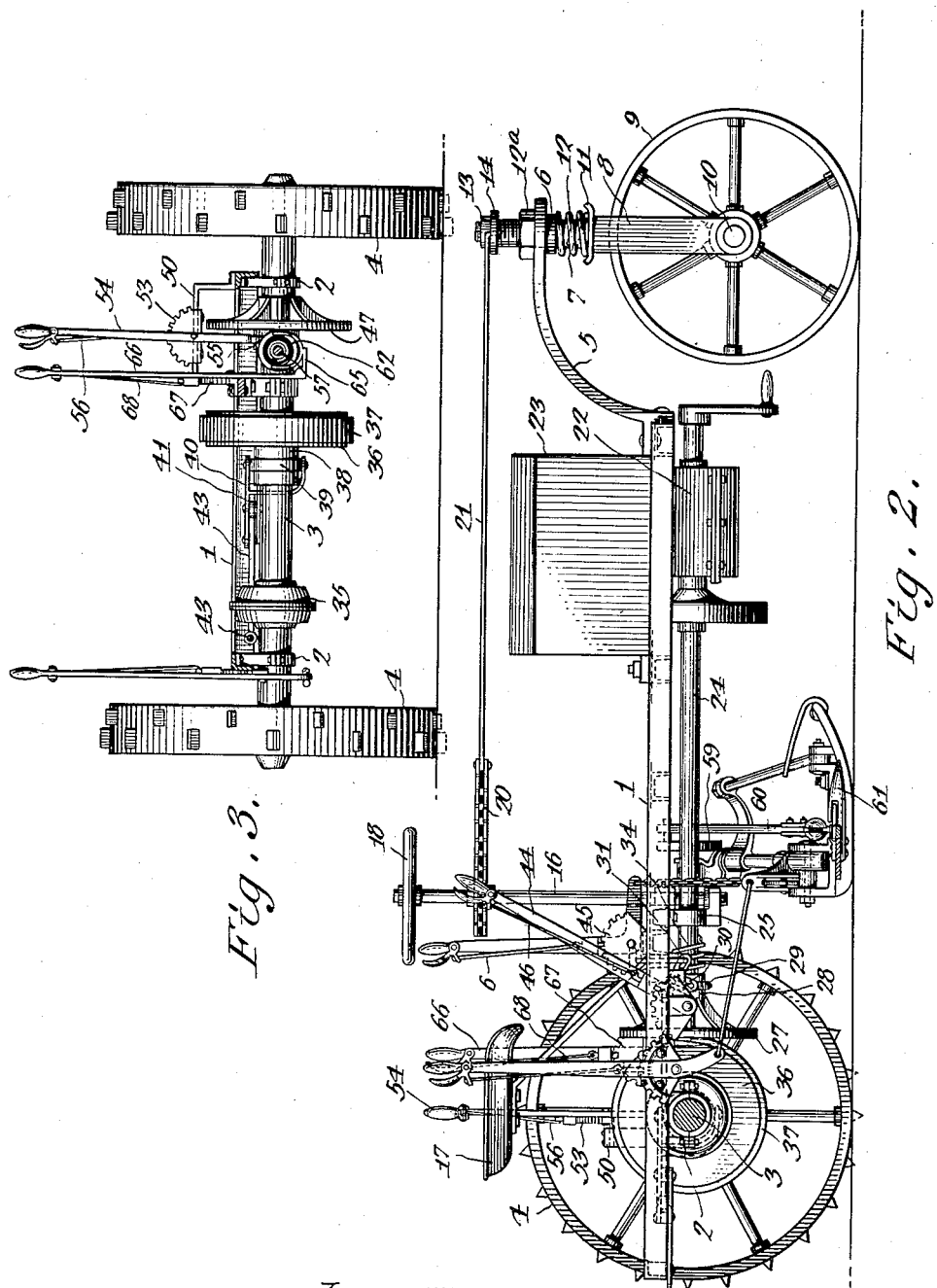

UNITED STATES PATENT OFFICE.

JONATHAN W. STUMP, OF ONTARIO, CALIFORNIA.

FIELD-MOWER.

1,042,167.

Specification of Letters Patent.

Patented Oct. 22, 1912.

Application filed March 20, 1911. Serial No. 615,612.

*To all whom it may concern:*

Be it known that I, JONATHAN W. STUMP, a citizen of the United States, residing at Ontario, in the county of San Bernardino and State of California, have invented certain new and useful Improvements in Field-Mowers, of which the following is a specification, reference being had therein to the accompanying drawing.

This invention relates to agricultural machines, and the principal object of the same is to provide novel means for driving and operating the same so that animal power is dispensed with, said means being manually controlled so that the same can be readily stopped when it is not desired to propel the machine, or to be cut-off from the operating mechanism so that the machine can be propelled without said mechanism being operated.

In addition to the foregoing prominent features, the invention contemplates a novel supporting frame, a front support therefor, and steering means for operating said support.

In carrying out the objects of the invention generally stated above it will be understood of course, that the essential features thereof are necessarily susceptible of changes in details and structural arrangements, one preferred and practical embodiment of which is shown in the accompanying drawings, wherein:—

Figure 1 is a top plan view of the improved agricultural machine. Fig. 2 is a view in side elevation thereof, one of the rear wheels and part of the cutting mechanism being omitted. Fig. 3 is a transverse vertical sectional view taken on the line 3—3, Fig. 1. Fig. 4 is a detail fragmentary perspective view of the rear portion of the supporting frame.

In the accompanying drawings the invention has been shown as a field mower and referring to said drawings by numerals, it will be seen that the invention comprises a rectangular frame 1 which is preferably formed of angle bars so that broad flat upper surfaces are provided. At the rear, the frame is provided with pendent bearings 2 in which the axle 3 is journaled, said axle having the traction wheels 4 mounted on its ends. At its forward end, the frame 1 is provided with an outwardly projecting upwardly curved platform 5 which preferably tapers in width and at its outer end is provided with a vertically arranged bearing sleeve 6 in which the shank 7 of a wheel-straddling yoke 8 is mounted. A wheel 9 is mounted on an axle 10 carried by said yoke 8. The upper end of the yoke 8 is equipped with an abutment flange 11 upon which a spiral spring 12 is seated. Said spring is coiled about the shank 7 and its upper end bears against the lower end of sleeve 6 so that it will yieldably support the forward end of frame 1 and cushion the same against shocks and jars incidental to the movements of the machine. The upper end portion of the shank 7 is threaded for the reception of an adjusting nut 12ª by means of which the tension of spring 12 can be regulated. A collar 13 is carried by the squared upper end of shank 7 and is provided with oppositely projecting arms 14. A key 15 is passed through the upper end of shank 7 to prevent accidental displacement of the collar 13.

A vertically arranged steering shaft 16 is suitably journaled in the frame 1 adjacent the operator's seat 17 and is equipped with a hand wheel 18. Said shaft 16 is also provided with a sprocket wheel 19 over which a chain 20 passes the end of which connects with rods 21 that project from the outer ends of arms 14. By this arrangement it will be seen that the machine can be readily steered from the operator's seat 17.

A motor 22 is carried by the forward end of frame 1 and is provided with a protecting hood or shield 23. The shaft 24 of the motor 22 projects toward the rear of the frame 1 and is supported by the hanger bearing 25 depending from a transverse brace bar 26. The rear end portion of shaft 24 has a friction disk 27 keyed or otherwise slidably fastened thereon. The hub 28 of disk 27 is provided with a loose collar 29 which has a crank connection 30 with a foot treadle 31 pivotally connected to a stud 32 projecting laterally from an angular bracket 33 carried by brace bar 26. Obviously by rocking treadle 31, disk 27 is moved longitudinally on shaft 24 toward bar 26. A spring 34 is coiled about shaft 24 and has one end fastened to hub 28 and the other end fastened to said shaft. Said spring opposes the movement imparted to disk 27 by treadle 31, and when the pressure of said treadle is removed, automatically projects said disk toward the rear end of shaft 24.

Axle 3 is provided with the usual differential 35, and at an intermediate portion has a friction disk 36 keyed or otherwise slidably fastened thereon the fiber faced periphery 37 of which is adapted to be placed in frictional contact with disk 27 to communicate rotary power to axle 3. The hub 38 of disk 36 is equipped with a loose collar 39 to which one end of a shifting lever 40 is pivotally connected. Lever 40 is connected to an arm 41 that is adjustably connected to and projects laterally from the rear end of frame 1. The other end of lever 40 is connected to a link 43 that extends from arm 41 and is pivotally connected to a rod 43ª that is operated by a hand lever 44 carried by the side of frame 1. It will be noted from the drawings that these three members 40, 41 and 43 are so connected to each other that the connection is in a triangular form, thus rendering them rigid with respect to each other so that the combination forms a species of bell-crank lever. A rack 45 carried by said frame 1 and a pawl 46 carried by lever 40 are used for locking said lever 40 in the desired position. It will be clear that the described arrangement of pivotally connected levers permits disk 36 to be adjusted longitudinally of axle 3 so that the speed of rotation of axle 3 can be varied according to the point of contact of disk 36 with disk 27 relative to the center of said disk 27. A transmission disk 47 is also slidable on axle 3 and is provided with a hub 48 carrying a loose collar 49. An arch bar 50 carried by one side of frame 1 spans disk 47 and has its inner end connected to a brace bar 51 that projects from brace bar 26. A transverse bar 52 connects bar 51 to one side of frame 1. Arched bar 50 has a rack 53 fastened thereto to the base of which a hand lever 54 is pivoted. The lower end of lever 54 has a crank connection 55 with collar 49, by means of which disk 47 can be shifted longitudinally on axle 3 by rocking lever 54. A pawl 56 is carried by lever 54 and engages rack 53 to lock said lever thereto.

A shaft 57 is supported longitudinally of frame 1 in a bearing 58 carried by bar 52. The forward end of shaft 57 has the usual eccentric connection 59 with pitman 60 that reciprocates the knives 61. The rear end of said shaft has a friction disk 62 slidable thereon which receives rotary power from disk 47. The hub 63 of disk 62 carries a loose collar 64 that has a crank connection 65 with a hand lever 66 pivotally connected to bar 51. A rack 67 is also carried by bar 51 and a pawl 68 carried by lever 66 engages said rack to lock said lever thereto. A spring 69 is coiled about shaft 57 and interposed between hub 63 and bar 52 and tends to project disk 62 toward the rear end of shaft 57. Lever 66 when rocked in one direction, moves disk 62 longitudinally of shaft 57 against the tension of spring 69, and as will be clear, the speed of rotation of shaft 57 is regulated according to the position of disk 62 relative to the center of disk 47.

From the foregoing it will be understood that the machine can be steered from the operator's seat and the operation of the machine also controlled therefrom. For instance, by pressing on the foot treadle 31, disk 27 can be removed from contact with disk 37, thereby temporarily cut off the power to the axle, and said disk 37 can be adjusted longitudinally of axle 3 to vary its position relative to the center of disk 27 and thereby regulate the speed of the axle. Disk 47 can be disengaged from disk 62 to cut off power to the cutting mechanism, and disk 62 can be adjusted on shaft 57 to vary its position relative to the center of disk 47, thereby regulating the speed of operation of the cutting mechanism.

What I claim as my invention is:—

In a device of the kind described, a frame, an engine thereon, said engine including a drive shaft, wheels supporting said frame, said wheel supported frame including a driving axle fixedly connected to certain of said wheels, a friction gearing between the driving axle and the driving shaft, said friction gearing comprising a pair of friction disks arranged at right angles to each other, a cutter bar, an operative connection between said cutter bar and said driving axle whereby the number of reciprocations of the movable member of the cutter bar will remain in a constant ratio to the amount of ground traversed without reference to the speed of the machine, means to shift the friction gear, said operative connection including a friction gear comprising a pair of friction disks arranged at right angles to each other whereby the speed ratio may be varied at will without reference to the speed of the machine, and means to move one of the last mentioned friction wheels across the face of the other.

In testimony whereof I hereunto affix my signature in presence of two witnesses.

JONATHAN W. STUMP.

Witnesses:
GEO. C. KING,
C. A. WARINER.